(12) United States Patent
Gerling et al.

(10) Patent No.: US 10,422,550 B2
(45) Date of Patent: Sep. 24, 2019

(54) BOILER

(71) Applicant: Viessmann Werke GmbH & Co KG, Allendorf (DE)

(72) Inventors: Detlev Gerling, Berlin (DE); Norbert Volkmann, Berlin (DE); Alexander Guhl, Berlin (DE)

(73) Assignee: Viessmann Werke GmbH & Co KG, Allendorf (DE)

( * ) Notice: Subject to any disclaimer, the term of this patent is extended or adjusted under 35 U.S.C. 154(b) by 198 days.

(21) Appl. No.: 15/546,078

(22) PCT Filed: Jan. 22, 2016

(86) PCT No.: PCT/DE2016/100024
§ 371 (c)(1),
(2) Date: Jul. 25, 2017

(87) PCT Pub. No.: WO2016/119776
PCT Pub. Date: Aug. 4, 2016

(65) Prior Publication Data
US 2018/0335229 A1    Nov. 22, 2018

(30) Foreign Application Priority Data
Jan. 26, 2015    (DE) .................. 10 2015 101 048

(51) Int. Cl.
*F24H 1/28* (2006.01)
*F28D 9/00* (2006.01)

(52) U.S. Cl.
CPC ............. *F24H 1/28* (2013.01); *F28D 9/0043* (2013.01)

(58) Field of Classification Search
CPC .................. Y02B 30/102; F24H 8/00
See application file for complete search history.

(56) References Cited

U.S. PATENT DOCUMENTS

| | | | |
|---|---|---|---|
| 8,091,515 B2 * | 1/2012 | Rigamonti | ............ F28D 1/0333 122/209.1 |
| 8,869,752 B2 | 10/2014 | Rausch et al. | |
| 10,126,014 B2 * | 11/2018 | Kim | .......................... F24H 8/00 |
| 2010/0300378 A1 * | 12/2010 | Rigamonti | .............. F24H 1/287 122/18.1 |

(Continued)

FOREIGN PATENT DOCUMENTS

| | | |
|---|---|---|
| DE | 20 2008 011 266 U1 | 12/2009 |
| DE | 10 2008 037 762 A1 | 2/2010 |
| EP | 1 989 499 B1 | 7/2011 |

(Continued)

OTHER PUBLICATIONS

International Search Report of PCT/DE2016/100024, dated May 31, 2016.

*Primary Examiner* — Gregory A Wilson
(74) *Attorney, Agent, or Firm* — Collard & Roe, P.C.

(57) ABSTRACT

A boiler includes a chamber designed to receive and conduct hot exhaust gases, the chamber being enclosed by two plate elements which have an angled design and are arranged relative to one another in a sandwich-like manner, and the chamber being connected to a flow guide that is designed between the plate elements and used to cool the hot exhaust gases. The flow guide is designed in the form of a flat gap channel which fully encloses the periphery of the chamber.

8 Claims, 3 Drawing Sheets

(56) References Cited

U.S. PATENT DOCUMENTS

2011/0303400 A1* 12/2011 Scearce ................ F28D 9/0012
165/164
2016/0298874 A1* 10/2016 Lovascio .............. F28F 9/0221

FOREIGN PATENT DOCUMENTS

| EP | 2 735 812 A2 | 5/2014 |
|---|---|---|
| JP | 2006-214628 A | 8/2006 |
| KR | 10-2012-0045249 A | 5/2012 |
| NL | 1015206 C2 | 11/2001 |
| WO | 2008/138803 A2 | 11/2008 |

* cited by examiner

BOILER

CROSS REFERENCE TO RELATED APPLICATIONS

This application is the National Stage of PCT/DE2016/100024 filed on Jan. 22, 2016, which claims priority under 35 U.S.C. § 119 of German Application No. 10 2015 101 048.8 filed on Jan. 26, 2015, the disclosures of which are incorporated by reference. The international application under PCT article 21(2) was not published in English.

BACKGROUND OF THE INVENTION

1. Field of the Invention

The invention relates to a boiler according to the preamble of patent claim 1.

2. Description of the Related Art

A heating boiler of the kind mentioned in the beginning is known from the patent document EP 2735812A2. This boiler consists of a chamber designed to receive and conduct hot exhaust gases, said chamber being enclosed by a plurality of plate elements which are chamfered and arranged relative to one another in a sandwich-like manner and connected to a plurality of flow guides configured respectively between the plate elements and used to cool the hot exhaust gases. The said flow guides are arranged below the chamber. The hot exhaust gas thus flows out of the chamber into the flow guides provided with crossing ribs or grooves and from there into an exhaust gas collecting chamber. With this arrangement the transfer of heat from the hot exhaust gas into the water which flows around the body from which the plate element is formed takes place, in particular, in the area of the ribbed pockets which enclose the flow guide.

The proviso outlined in the preamble of patent claim 1 that the chamber be formed of two plate elements, expresses the idea that—as a basic module so to speak—basically at least two plate elements are provided, i.e. according to the invention (as with the state of the art mentioned in the beginning) provision is made, as a rule, for not just two, but quite a number or plurality of plate elements to be provided. Accordingly, the same then applies to the flow guide. The length or size of the chamber is therefore the basis for the number of plate elements.

SUMMARY OF THE INVENTION

The invention is based on the requirement to improve a boiler of the kind mentioned in the beginning. In particular a boiler with improved heat transfer is to be proposed. In addition the risk of calcification and the thermal stresses on the material can be reduced.

This requirement is solved for a boiler of the kind mentioned in the beginning by the features cited in the characterizations of patent claim 1.

According to the invention therefore provision is made for the flow guide, in order to form a channel flow of the exhaust gas starting on the side of the chamber, to be configured in the form of a flat gap channel, through which the exhaust air flows and which fully encloses the periphery of the chamber.

Or, expressed in another way, the solution according to the invention is characterised, in particular, in that the chamber is configured so as to be fully enclosed on its periphery by the flow guide designed as a flat gap channel, i.e. heat transfer from the exhaust air to a heat carrier medium surrounding the plate elements takes place not only below the chamber, but in a flat gap channel radially fully enclosing the chamber. The hot exhaust air, in deviation from the above-mentioned state of the art, thus gets into the flow guide over the whole of its periphery, so that thermal stresses during entry into the flat gap channel are minimised via an even distribution in peripheral direction.

A flat gap channel is thus understood to be a flow guide, which comprises an entry cross-section, an exit cross-section and an essentially flat channel in between which is limited by the plate elements, wherein the length of the channel which is oriented parallel to the main flow direction of the exhaust gas is greater by a multiple than the height of the channel or the distance between the plate elements in the channel. For reasons of stability, which will be more fully explained later on, a plate element in the area of the flat gap channel may then be provided with nubs or similar which are supported against the opposite plate element.

With an especially preferred embodiment of the solution according to the invention provision is made for the flat gap channel to be implemented as an enclosed collecting channel formed from the plate elements and widened in relation to the flat gap channel for receiving and conducting the cooled exhaust gases. In order to be able to operate the boiler according to the invention as a condensing boiler, provision is especially preferably made for the collecting channel to be designed so that it leads into a second flat gap channel, facing away from the chamber. This point too will be more fully explained below.

Other advantageous further developments are revealed in the dependent patent claims.

For completeness sake, reference is additionally made to the more remote documents EP 1989499B1 and DE 102008037762A2.

BRIEF DESCRIPTION OF THE DRAWINGS

The boiler according to the invention including its further developments according to the dependent patent claims will now be more fully explained with reference to the graphic representation of three exemplary embodiments, in which

DETAILED DESCRIPTION OF THE PREFERRED EMBODIMENTS

The boiler depicted in the figures consists, to begin with, of a chamber 1 configured to receive and conduct hot exhaust gases. The hot exhaust gases are generated with the aid of a burner (not specifically shown), (in particular a gas burner or oil burner), wherein the same may be arranged optionally in the chamber 1 itself, which then forms a combustion chamber, or as with the solution according to the initially cited EP 2735812A2, in a combustion chamber preceding the chamber 1. In both cases a lid element 10 for closing the chamber 1 is arranged on the end opposite the burner.

Figure 6:
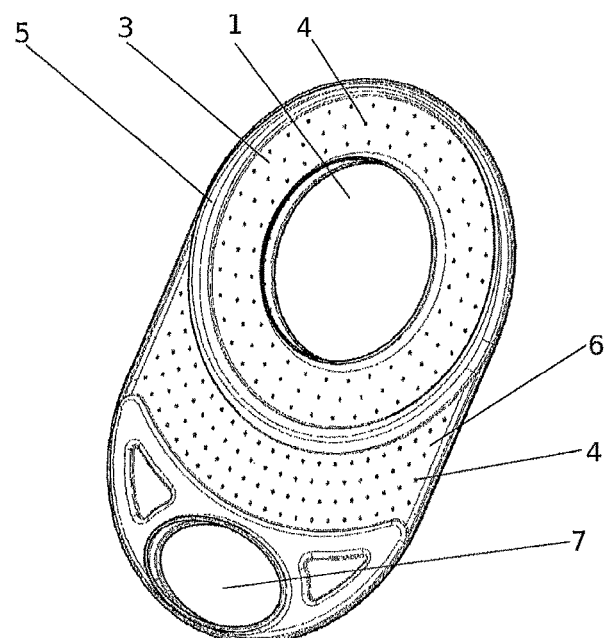
FIG. 6 shows a perspective external view of a pocket consisting of two plate elements for the boiler according to the invention.
Figure 7:
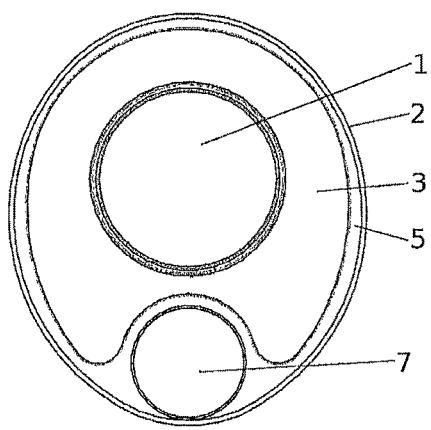
FIG. 7 shows a top view of an alternative embodiment of a plate element for a boiler according to the invention.

As revealed in the figures the chamber 1 is enclosed by two plate elements 2 which are chamfered or deep-drawn and arranged relative to each other in sandwich form, in particular welded to each other, and connected to a flow guide 3 formed between the plate elements 2 for cooling the hot exhaust gases. The plate elements 2 which when seen from above, as shown in FIGS. 6 and 7, preferably comprise an oval shape, preferably consist of steel in particular stainless steel.

The important point for the boiler according to the invention, and one which applies to all possible embodiments, is that the flow guide 3 is configured as a flat gap channel fully enclosing the chamber 1 across the entire periphery.

The consequence of this proviso is that the hot exhaust gas exiting from the chamber is distributed across a large heat transfer surface in the flat gap channel and thus, for only a small inclination of calcifying, a high cooling or condensation rate can be achieved in low-temperature mode or even condensation mode (for which preferably a second flat gap channel 6 is provided as will be explained in more detail further below). And since a lot of condensate ultimately implies a high degree of efficiency, it is possible thanks to the invention to manufacture a compact, very efficient condensing boiler at low cost.

Figure 5:
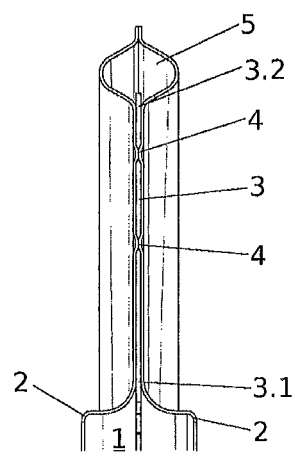
FIG. 5 shows, in section, a detail view of the flat gap channel according to the invention, limited by two plate elements, showing an entry cross-section on the side of the chamber and an exit cross-section on the side of the collecting channel.

As clearly indicated in particular in FIG. 5 provision is made particularly preferably that the flat gap channel is formed limited by an entry cross-section 3.1 on the side of the chamber and by an exit cross-section 3.2 on the side facing away from the chamber. Furthermore both the entry cross-section 3.1 and the exit cross-section 3.2 are formed so as to fully enclose the chamber 1 with a distance (this applies to the embodiment as per FIGS. 1 to 6) between the entry cross-section 3.1 and the exit cross-section 3.2, which is preferably (but not mandatorily) constant over the whole of the periphery.

In order to achieve as even a distribution of the heat current densities as possible, provision is further preferably made that the entry cross-section 3.1 is/are optionally provided with an inlet contour and/or the exit cross-section 3.2 is/are provided with an outlet contour.

As further revealed in the figures provision is especially preferably made that the flat gap channel, parallel to the main flow direction, has a length which corresponds to a multiple of a distance between the plate elements 2 limiting the flat gap channel. Expressed in actual numbers provision is made especially preferably for the flat gap channel to have a gap length of approx. 30 to 150 mm for a distance between the plate elements 2 (gap width) of approx. 0.5 to 4 mm.

In order to ensure that a water pressure acting on the plate elements 2 from outside (see detailed explanation further below) does not lead to a deformation of the flat gap channel according to the invention, provision is preferably further made that supporting elements 4 are provided between the plate element 2 in the area of the flat gap channel. These are formed in a manner known as such as nubs or elongate beading, wherein however, according to the invention, in principle the further proviso applies that the distance of the plate elements 2 between the entry cross-section 3.1 and the exit cross-section 3.2—apart from the singular supporting elements 4 provided, as required, for stability reasons—for forming the flat gap channel is configured to remain constant, in other words, the flat gap channel is limited by flat walls at a distance changing by, at most, only a minimum over its run length.

Further provision is especially preferably made that the flat gap channel is configured so as to be enclosed by a collecting channel 5 formed by the plate elements 2 and widened in relation to the flat gap channel for receiving and conducting the cooled exhaust gas (including condensate), as a result of which the collecting channel 5 is also configured so as to fully enclose the chamber 1 across the whole periphery and to join the exit cross-section 3.2 of the flat gap channel.

In order to even further increase the condensation rate, provision is additionally made in the embodiment according to FIGS. 1 to 6 for the collecting channel 5 to be configured so as to face away from the chamber and ending in a second flat gap channel 6. This second flat gap channel 6 is preferably, as shown in particular in FIG. 6, configured so as to enclose a section of the collecting channel 5 in a crescent-shaped manner (or a portion of a circular ring).

Furthermore provision is made that optionally the first flat gap channel (i.e. the flow guide 3—see FIG. 7), the collecting channel 5 or the second flat gap channel 6 end in a second chamber 7, the first ending directly, the others facing away from the collecting chamber. This second chamber 7, which is arranged below a first chamber 1 for a particularly good condensate removal (preferably vertical), and is also formed of plate elements, is configured as an exhaust gas collecting chamber with a connection 9 for the discharge of exhaust gas. In addition, provision is made, taking in account the reduction in volume of the exhaust gas during cooling, that the chamber 1 has a volume 1 which is larger than the volume of the exhaust gas collecting chamber.

Figure 1:
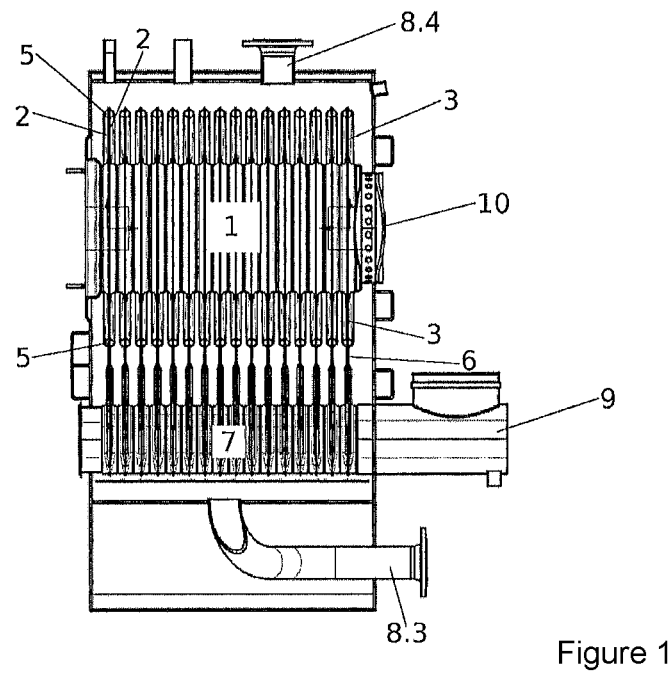
FIG. 1 shows a boiler according to the invention in section with a total of sixteen pockets joined together in a sandwich-like manner, each made up of two plate elements.
Figure 2:
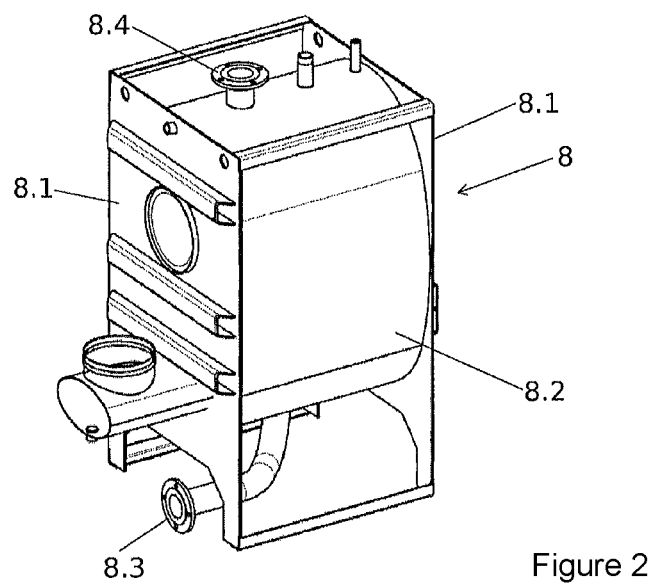
FIG. 2 shows a perspective view of the boiler of FIG. 1.
Figure 3:
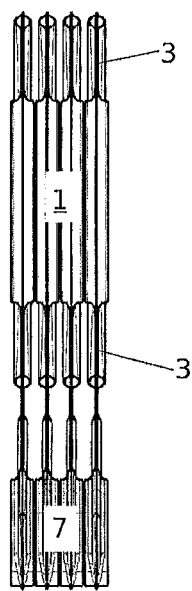
FIG. 3 shows, in section, four pockets consisting of respectively two plate elements of the boiler of FIG. 1.
Figure 4:
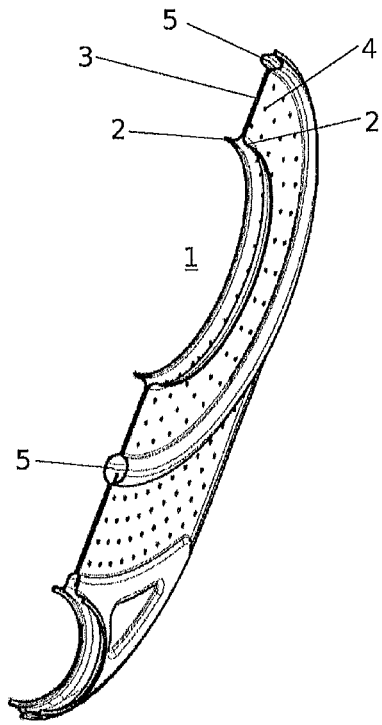
FIG. 4 shows, in section, a single pocket consisting of two plate elements of the boiler shown in FIG. 1.

In addition, as shown in FIGS. 1 and 2, provision is preferably made that the housing 8 is formed of two end plates 8.1 oriented in parallel to the plate elements 2 and a jacket 8.2 arranged between the two end plates 8.1 and peripherally fully enclosing the plate elements 2. Further the housing 8 is provided with a supply connection 8.3 preferably at the bottom and a discharge connection 8.4 preferably at the top for a liquid heat carrier medium.

Furthermore, expressed again in other words, provision is preferably made that two plate elements 2 form a pocket formed to conduct the exhaust gas. With the boiler according to FIGS. 1 to 6 sixteen such pockets are connected, for example welded, to each other via respective chamfers encircling the chamber 1 and the second chamber 7. This pocket packet consisting of many pockets is then arranged in the housing 8 filled with the liquid heat carrier medium (in particular heating circuit water).

Figure 8:
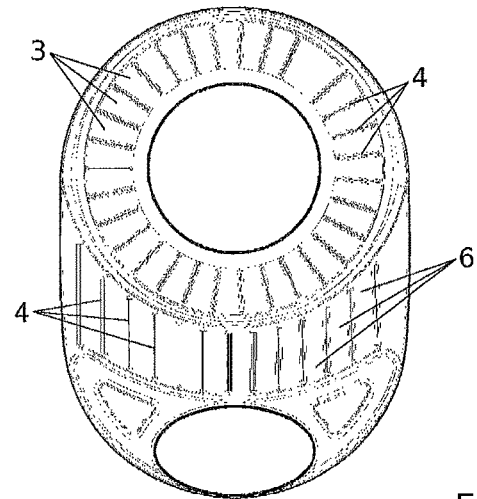
FIG. 8 shows a top view of a further embodiment of a plate element for a boiler according to the invention.

In FIG. 8 finally an embodiment is shown, where both the first flat gap channel and the second flat gap channel 6 is formed of a number of single flat gap channels arranged in parallel with each other (it is of course possible to shape only the first flat gap channel or only the second flat gap channel in this way). These single flat gap channels may each be of a different length and a different gap height. As already mentioned above as an option, in this embodiment of forming a plurality of single flat gap channels, the support elements 4 are shaped, not as nubs, but as elongate beading.

The boiler according to the invention operates as follows:

The hot exhaust gas in chamber 1 flows through the flow guide 3 formed as a flat gap channel into the collecting channel 5. Thanks to the gap flow the exhaust gas is able to pass a large part of its warmth onto the heat carrier medium (heating circuit water) encircling the pockets. This flows into the housing 8 via the supply connection 8.3 (also called return connection) and leaves the housing via the discharge connection 8.4 (also called flow connection).

In the embodiment as per FIGS. 1 to 6 the exhaust gas which has arrived in the collecting channel 5 and is by now distinctly cooler, reaches the second chamber 7 formed as an exhaust gas collecting chamber via the second flat gap channel 6, where thanks to the gap flow a considerable amount of heat can again be transferred to the heating circuit water. From here, where due to the force of gravity all the condensate accumulating for discharge out of the boiler also collects, the exhaust gas which by now is considerably cooler reaches the chimney of the building (not separately shown), in which the boiler resides, via the exhaust gas discharge connection 9.

| List of reference symbols | |
|---|---|
| 1 | chamber |
| 2 | plate element |
| 3 | flow guide |
| 3.1 | entry cross-section |
| 3.2 | exit cross-section |
| 4 | supporting element |
| 5 | collecting channel |
| 6 | second flat gap channel |
| 7 | second chamber |
| 8 | housing |
| 8.1 | end plate |
| 8.2 | jacket |
| 8.3 | supply connection |
| 8.4 | discharge connection |
| 9 | exhaust gas discharge connection |
| 10 | lid element |

The invention claimed is:

1. A boiler comprising a chamber for receiving and conducting hot exhaust gases, the chamber being enclosed by two plate elements which are chamfered and arranged relative to one another in a sandwich-like manner and connected to a flow guide formed between the plate elements and serving to cool the hot exhaust gases, wherein the flow guide is configured as a flat gap channel fully enclosing the periphery of the chamber,
   wherein the flat gap channel is configured to be enclosed by a collecting channel formed from the plate elements and widened in relation to the flat gap channel for receiving and conducting the cooled exhaust gases, and
   wherein the collecting channel is—on its side facing away from the chamber—ending in a second flat gap channel.

2. The boiler according to claim 1, wherein the flat gap channel is limited by an entry cross-section on the side of the chamber and an exit cross-section on the side facing away from the chamber.

3. The boiler according to claim 2, wherein both the entry cross-section and the exit cross-section are configured so as to fully enclose the periphery of the chamber.

4. The boiler according to claim 1, wherein the flat gap channel, parallel to the main flow direction of the exhaust gas has a length, which corresponds to a multiple of a distance between the plate elements limiting the flat gap channel.

5. The boiler according to claim 1, wherein supporting elements are provided between the plate elements in the area of the flat gap channel.

6. The boiler according to claim 1, wherein the second flat gap channel is—on its side facing away from the collecting channel—ending in a second chamber.

7. The boiler according to claim 1, wherein two plate elements form a pocket designed for conducting the exhaust gas.

8. The boiler according to claim 7, wherein the pocket is arranged in a housing conducting a liquid heat carrier medium.

* * * * *